(12) United States Patent
Suciu et al.

(10) Patent No.: US 10,018,360 B2
(45) Date of Patent: Jul. 10, 2018

(54) TURBINE STAGE COOLING

(71) Applicant: United Technologies Corporation, Hartford, CT (US)

(72) Inventors: Gabriel L Suciu, Glastonbury, CT (US); Brian D Merry, Andover, CT (US); James D Hill, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 440 days.

(21) Appl. No.: 14/728,991

(22) Filed: Jun. 2, 2015

(65) Prior Publication Data

US 2015/0354822 A1 Dec. 10, 2015

Related U.S. Application Data

(60) Provisional application No. 62/008,805, filed on Jun. 6, 2014.

(51) Int. Cl.
| | |
|---|---|
| *F02C 6/08* | (2006.01) |
| *F23R 3/10* | (2006.01) |
| *F02C 3/04* | (2006.01) |
| *F01D 5/08* | (2006.01) |
| *F01D 9/06* | (2006.01) |
| *F01D 25/12* | (2006.01) |
| *F02C 7/18* | (2006.01) |

(52) U.S. Cl.
CPC ............... *F23R 3/10* (2013.01); *F01D 5/082* (2013.01); *F01D 9/06* (2013.01); *F01D 25/125* (2013.01); *F02C 3/04* (2013.01); *F02C 6/08* (2013.01); *F02C 7/185* (2013.01); *F05D 2220/323* (2013.01); *F05D 2260/213* (2013.01); *F05D 2270/303* (2013.01); *F05D 2270/3062* (2013.01); *Y02T 50/676* (2013.01)

(58) Field of Classification Search
USPC ... 60/772, 39.08, 226.1, 736, 782, 785, 266, 60/805, 806; 415/114–117, 175–178
See application file for complete search history.

(56) References Cited

U.S. PATENT DOCUMENTS

| 6,644,012 B2 | 11/2003 | Hoffmann et al. | |
|---|---|---|---|
| 7,827,795 B2 * | 11/2010 | Hicks ..................... | F02C 3/30 60/39.83 |
| 7,954,324 B2 * | 6/2011 | Holland .................. | F02C 6/18 60/736 |

(Continued)

FOREIGN PATENT DOCUMENTS

| EP | 1923539 | 5/2008 |
|---|---|---|
| EP | 2927426 | 10/2015 |

OTHER PUBLICATIONS

Extended European Search Report for European Application No. 15170840.1 dated Oct. 29, 2015.

*Primary Examiner* — Binh Q Tran
(74) *Attorney, Agent, or Firm* — Carlson, Gaskey & Olds, P.C.

(57) ABSTRACT

A turbine injection system for a gas turbine engine includes a first end operable to receive air from a heat exchanger, a second end operable to distribute mixed cooling air to a turbine stage, an opening downstream of said first end and a mixing plenum downstream of said first end and said opening. The opening provides a direct fluid pathway into said turbine injection system.

25 Claims, 3 Drawing Sheets

(56) References Cited

U.S. PATENT DOCUMENTS

| | | | |
|---|---|---|---|
| 8,056,345 B2* | 11/2011 | Norris | F02C 7/14 |
| | | | 60/736 |
| 8,495,883 B2 | 7/2013 | Foust et al. | |
| 9,334,803 B2* | 5/2016 | Intile | F02C 7/12 |
| 2009/0074589 A1* | 3/2009 | Fang | F02C 7/12 |
| | | | 416/97 R |
| 2013/0219917 A1 | 8/2013 | Suciu et al. | |
| 2013/0219918 A1 | 8/2013 | Suciu et al. | |
| 2014/0123666 A1 | 5/2014 | Ekanayake et al. | |
| 2014/0126991 A1 | 5/2014 | Ekanayake et al. | |
| 2015/0354822 A1* | 12/2015 | Suciu | F23R 3/10 |
| | | | 60/772 |

* cited by examiner

TURBINE STAGE COOLING

TECHNICAL FIELD

The present disclosure relates generally to turbine stage cooling for a gas turbine engine, and more specifically to a method and apparatus for cooling a turbine stage using an overcooled cooling fluid supply.

CROSS-REFERENCE TO RELATED APPLICATION

This application claims priority to U.S. Provisional Application No. 62/008,805 filed Jun. 6, 2014.

BACKGROUND

Current high performance gas turbine engines utilize various techniques to maximize performance of the gas turbine engine. One effect of the performance maximization techniques is an increase in the temperature of fluid exiting a high pressure compressor section of the gas turbine engine. The fluid exiting the high pressure compressor section is referred to as a high pressure compressor discharge and is discharged into a combustor section. The increased temperature of the high pressure compressor discharge may exceed optimum cooling temperatures of cooling air for at least one stage of a high pressure turbine.

Some existing gas turbine engines cool at least the first stage of the high pressure turbine by redirecting a portion of the high pressure compressor discharge onto the first stage of the high pressure turbine. As the discharge air is cool, relative to the temperature of the turbine stage, this provides a cooling effect. When the temperature of the high pressure compressor discharge air exceeds optimum cooling temperatures of the turbine stage, the cooling capability of the discharge air is reduced, and the workable lifespan of the cooled turbine stage may be correspondingly reduced.

SUMMARY OF THE INVENTION

An exemplary embodiment of a gas turbine engine includes a compressor section having a plurality of compressor stages, a combustor disposed within a combustor section, wherein the combustor section is fluidly connected to the compressor section, a turbine section fluidly connected to the combustor, the turbine section having at least one stage, a cooling air exit disposed on a wall of the combustor section, a first fluid pathway connecting the cooling air exit to an input of a heat exchanger, a second fluid pathway connecting a first output of the heat exchanger to a turbine injection system, an opening fluidly connecting the turbine injection system to the combustor section, and a mixing plenum downstream of the opening.

In a further example of the above embodiment, the cooling air exit is disposed on a radially outward wall of the combustor section.

In a further example of any of the above embodiments, the heat exchanger further comprises a second output, and wherein the second output is fluidly connected to at least one other engine component, thereby providing cooling air to the at least one other engine component.

In a further example of any of the above embodiments the at least one other engine component includes an engine bearing compartment.

In a further example of any of the above embodiments the mixing plenum is a segment of the turbine injection system downstream of the opening.

In a further example of any of the above embodiments the mixing plenum is disposed between an output of the turbine injection system and the turbine section.

In a further example of any of the above embodiments air entering the turbine injection system from the heat exchanger is below a first threshold temperature.

In a further example of any of the above embodiments air entering the turbine injection system through the opening is above a second threshold temperature, the second threshold temperature being higher than the first threshold temperature.

In a further example of any of the above embodiments air exiting the mixing plenum is at a temperature between the first threshold and the second threshold.

A further example of any of the above embodiments includes a controller controllably coupled to the buffer heat exchanger and operable to control active cooling operations of the heat exchanger.

A further embodiment of any of the above examples includes at least one of a valve disposed in the cooling air exit and a valve disposed in the opening.

In a further example of any of the above embodiments at least one of the valve disposed in the cooling air exit and the valve disposed in the opening is controllably coupled to the controller.

An exemplary embodiment of a turbine injection system for a gas turbine engine includes a first end operable to receive air from a heat exchanger, a second end operable to distribute mixed cooling air to a turbine stage, an opening downstream of the first end, wherein the opening provides a direct fluid pathway into the turbine injection system, and a mixing plenum downstream of the first end and the opening.

In a further example of any of the above embodiments air at the first end is at a temperature below a first threshold temperature.

In a further example of any of the above embodiments a temperature of air at the opening exceeds a second threshold temperature, and wherein the second threshold temperature is in greater than the first threshold temperature.

In a further example of any of the above embodiments a temperature of air at a downstream end of the mixing plenum is between the first threshold temperature and the second threshold temperature.

An exemplary embodiment of a method for providing cooling air to a turbine stage in a gas turbine engine includes extracting air from a combustor section, cooling the air using a heat exchanger, providing a first portion of the air to a cooling plenum, mixing the first portion of the air with combustor air in the cooling plenum, thereby achieving a desired cooling air temperature, and providing a second portion of the air to at least one other component of the gas turbine engine directly from the heat exchanger.

In a further example of any of the above embodiments mixing the first portion of the air with combustor air in the cooling plenum comprises receiving air directly from the combustor section through a turbine injection system opening upstream of the mixing plenum.

In a further example of any of the above embodiments cooling the air using a heat exchanger comprises overcooling the air below a first threshold temperature, wherein the first threshold temperature is a minimum temperature required to provide full cooling of at least one turbine stage without overcooling the at least one turbine stage.

In a further example of any of the above embodiments mixing the first portion of the air with combustor air in the cooling plenum, thereby achieving a desired cooling air temperature comprises mixing overcooled air from the heat exchanger with air directly from the combustor section These and other features of the present invention can be best understood from the following specification and drawings, the following of which is a brief description.

DETAILED DESCRIPTION OF AN EMBODIMENT

Figure 1:
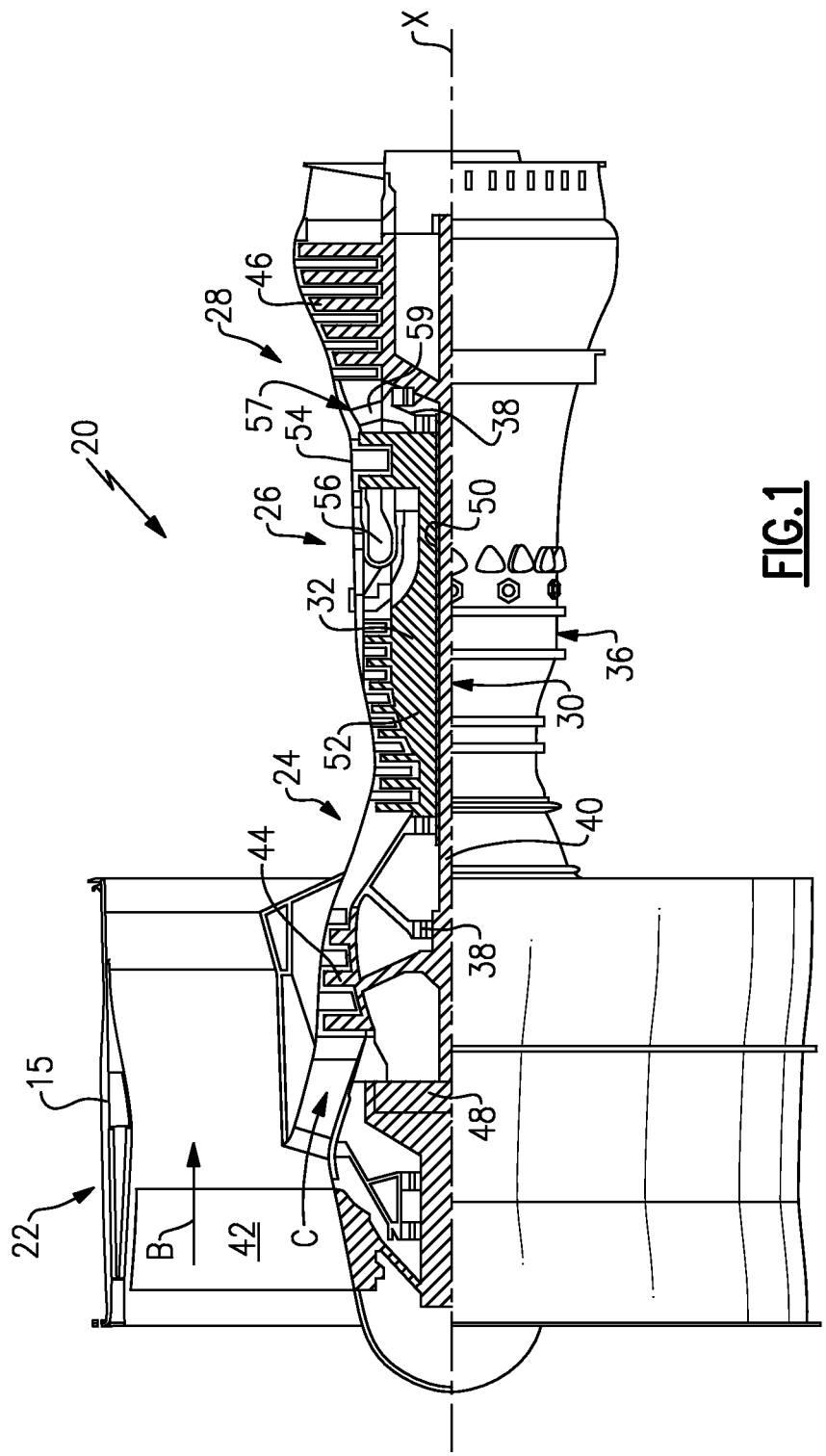
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second.

Figure 2:
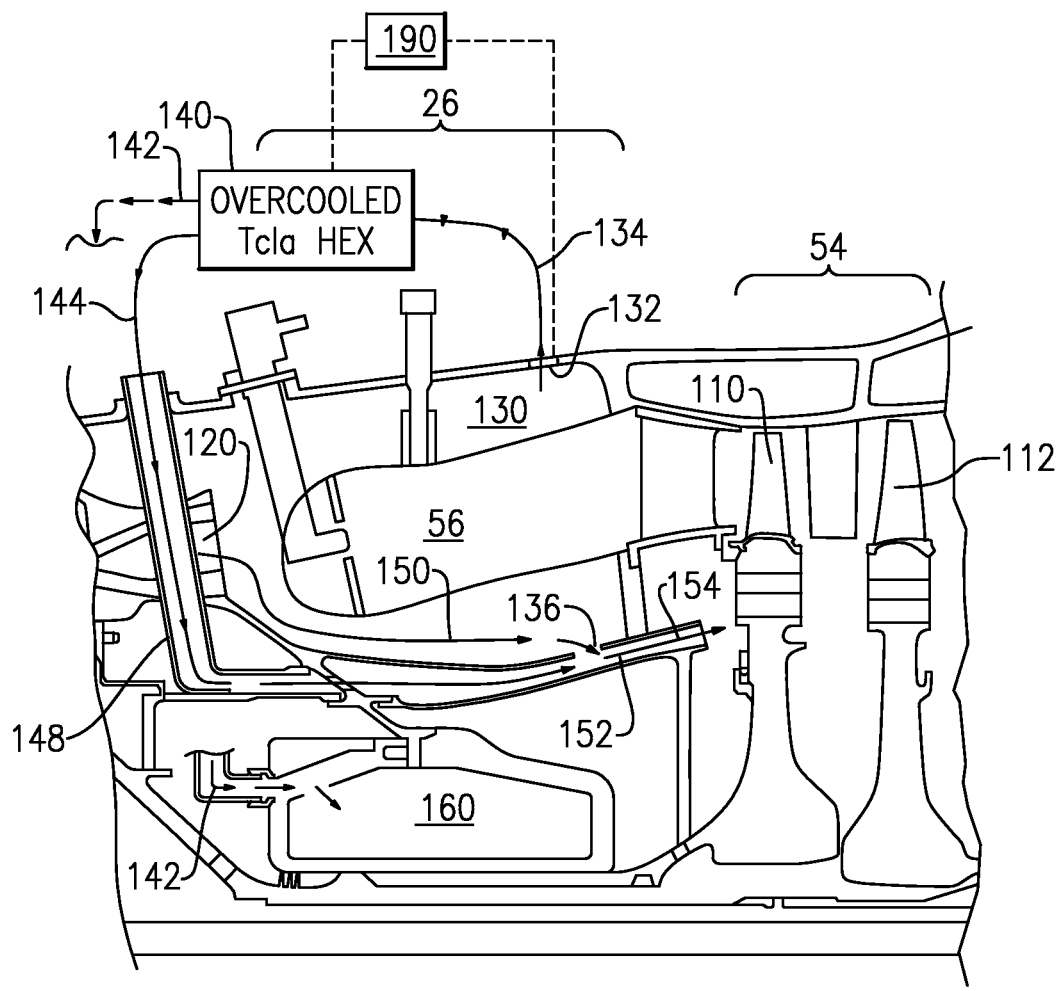
FIG. 2 schematically illustrates a partial view of the gas turbine engine of FIG. 1.

FIG. 2 schematically illustrates the combustor section 26 and a portion of the high pressure turbine 54 of FIG. 1, in greater detail. During operation of the gas turbine engine 20, high pressure compressor discharge fluid exits the high pressure compressor section 24 via a compressor section discharge 120. The compressor section discharge 120 directs the discharged fluid into a combustion chamber 130 which houses and surrounds the combustor 56. Combustion gasses are expelled from the combustor 56 into the high pressure turbine 54 due to the ignition of fuel within the combustor 56. The expelled combustion gasses are at a high temperature and drive the rotors 110, 112 of the turbine section 54 to rotate. Due to the extreme temperatures, the combustion gasses also heat the high pressure turbine 54 and necessitate cooling.

A cooling air exit 132 is located on a radially outward edge of the combustor chamber 130 and allows a portion of the discharge fluid from the high pressure compressor section 52 to be transferred to a heat exchanger 140. In some examples, the heat exchanger 140 is referred to as an overcooled turbine cooling air (Tcla) heat exchanger (HEX). The fluid from the compressor section discharge 120 enters the combustor chamber 130, and a portion of the compressor section discharge is removed from the combustor chamber 130 through the cooling air exit 132. This portion is referred to as the actively cooled air 134. The cooling air exit 132 can be valved in some examples, allowing a controller 190 to control an amount of air transferred to the heat exchanger 140. In other examples, the cooling air exit 132 can include multiple openings distributed circumferentially about the outer diameter. In yet further examples, the cooling air exit 132 can be metered allowing a constant volume of fluid through the cooling air exit 132.

The actively cooled air 134 is directed to the heat exchanger 140. The heat exchanger 140 cools the actively cooled air 134 using known cooling techniques. In some examples, the heat exchanger 140 is connected to a controller 190, and the controller 190 controls the cooling of the actively cooled air 134 based on operating conditions of the turbine engine 20, or any other factor. Once the actively cooled air 134 has been cooled in the heat exchanger 140, the air is output from the heat exchanger 140 through an overcooled turbine airflow 144 and a buffer cooling air flow 142. In the illustrated example, the buffer cooling air flow 142 is provided to a bearing compartment 160. In alternate examples the buffer cooling air flow 142 can be provided to any other gas turbine engine component for cooling, and is not limited to providing bearing air.

The overcooled turbine cooling airflow 144 passes through a turbine injector 148 to a mixing plenum 152. Immediately prior to the mixing plenum 152 in the turbine injector 148 is an opening 136 directly connecting the turbine injector 148 to the combustor chamber 130. The opening 136 provides a direct flowpath allowing compressor discharge air 150 to enter the turbine injector pipe 148 from the combustor chamber 130. The compressor discharge air 150 and the overcooled cooling airflow 144 mix in the mixing plenum 152 to form a desired temperature cooling airflow 154. In some examples, the desired temperature of the cooling airflow is a range of temperatures with a first temperature threshold as the lower bound of the range and a second temperature threshold as the upper bound of the range. In these examples, a fluid having a temperature below the first threshold is overcooled. Similarly, a fluid having a temperature above the second threshold is too hot for cooling. The desired temperature cooling airflow 154 is directed onto a turbine first stage 110 by the turbine injector 148 and cools the first turbine stage 110. In alternate examples, the desired temperature cooling airflow 154 can also be directed toward the second stage 112 of the high pressure turbine 54 and preform the same cooling aspects.

Furthermore, while illustrated herein as a portion of the turbine injector 148, the mixing plenum 154 can be a separate chamber fed by the turbine injector 148, with the separate chamber in turn directing the desired temperature cooling airflow 154 onto the turbine first stage 110.

Figure 3:
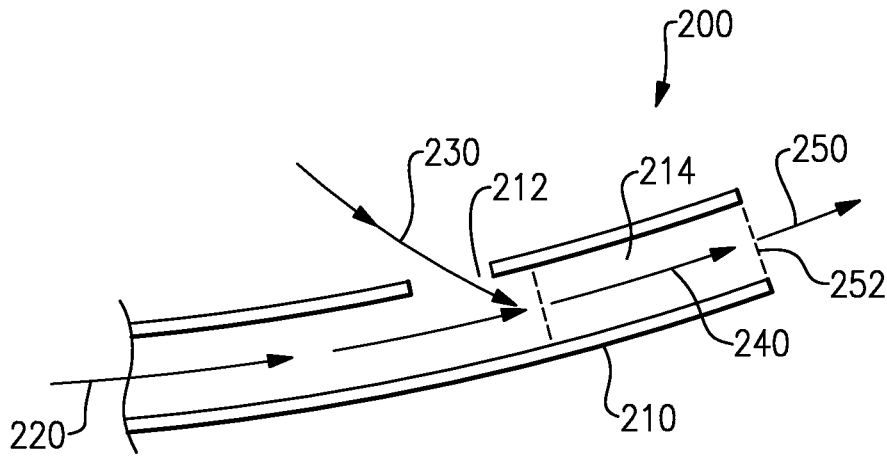
FIG. 3 schematically illustrates a cooling air pipe for use in the gas turbine engine of FIG. 1.

With continued reference to FIG. 2, FIG. 3 schematically illustrates a portion of a turbine injector 200, such as the turbine injector 148 illustrated in FIG. 2. The turbine injector 200 includes a body 210 having a primary portion 220 that directs an overcooled cooling airflow 144 from the heat exchanger 140 to a mixing plenum 214. The illustrated mixing plenum 214 is an end portion of the body 210 immediately after an opening 212. The opening 212 connects the turbine injector 148 to a combustion chamber 130 and receives compressor discharge air 230 directly from the combustion chamber 130. The compressor discharge air is too hot to provide full cooling.

The compressor discharge air 230 and the overcooled cooling airflow 144 are mixed in the mixing plenum 214 in a mixing flow 240. Once fully mixed, the turbine injector 200 outputs turbine cooling air 250 through an end opening 252. The end opening 252 is positioned and oriented such that turbine cooling air is directed onto the first stage 110 of the high pressure turbine 54, thereby cooling the rotor blade and rotor disks of the first stage 110.

Figure 4:
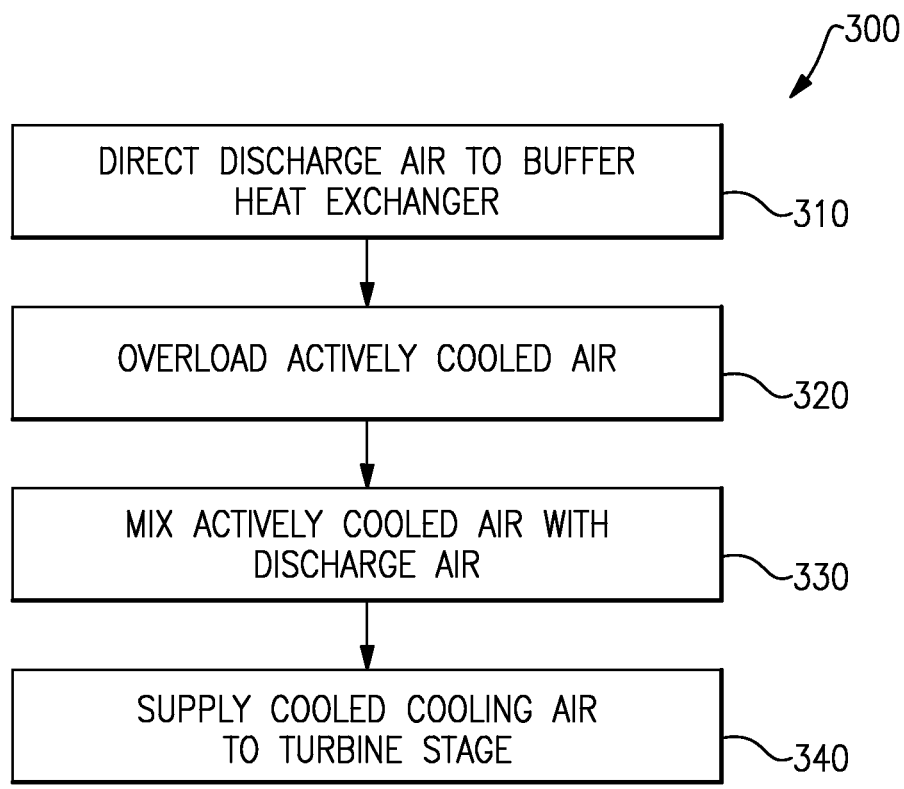
FIG. 4 is a flowchart illustrating a process for partially overcooling turbine stage cooling air.

FIG. 4 illustrates a flowchart 300 showing a general process for providing cooling air to the first turbine stage using the apparatus of FIG. 2. Initially, the discharge air is directed to the heat exchanger 140 in a "Direct Discharge Air to Heat Exchanger" step 310. The heat exchanger 140 overcools the actively cooled air using any known heat exchange technique in an "Overcool Actively Cooled Air" step 320. The overcooled air is then mixed with direct discharge air in a "Mix Actively Cooled Air with Discharge Air" step 330. The mixed air is then provided as cooling air to the first stage of the high pressure turbine 54 in a "Supply Cooled Cooling Air to Turbine Stage" step 340.

Referring again to FIGS. 2 and 3, during practical operation of the gas turbine engine 20, the buffer heat exchanger 140 cools the actively cooled air 134 to be within a temperature range required to adequately cool the bearing compartment 160. The temperature required to adequately cool the bearing compartment 160 is lower than the optimum temperature range required to cool the first turbine stage in the high pressure turbine 54. In a system that provides air directly from the heat exchanger 140 to the first turbine stage 110 as turbine cooling air, the turbine cooling air is cooler than required for properly cooling the turbine first stage. In this situation, the turbine cooling air is referred to as being overcooled.

While the heat exchanger 140 overcools the overcooled cooling airflow 144 that passes through the heat exchanger 140, the amount of overcooled cooling airflow 144 passing through the heat exchanger 140 in the illustrated example is less than the total volume of air required for cooling the corresponding turbine stage.

In order to provide a sufficient volume of the actively cooled air 134, a portion of the compressor section discharge air 150 is combined with the overcooled cooling airflow 144 in the mixing plenum 152 as described above. The addition of the compressor discharge air 150 to the overcooled cooling airflow 144 raises the end temperature of the mixed cooling air 154 and increases the volume of the mixed cooling air 154 to desired levels. The mixing plenum 152 is sized such that mixed cooling air 154 exiting the mixing plenum is fully mixed with an even temperature and flow characteristic at an exit of the mixing plenum. As a result, a steady stream of mixed cooling air 154 having a single temperature is directed onto the corresponding turbine stage.

By tuning the amount of airflow in the overcooled cooling airflow 144 output from the heat exchanger 140, the resultant temperature and volume of the mixed cooling air 154 can be controlled or adjusted in order to achieve a desired volume and temperature for the air cooling the corresponding turbine stage. In some examples, the amount of overcooled cooling airflow 144 output by the buffer heat exchanger 140 is set at a single volume during manufacturing of the gas turbine engine 20. In alternative examples, the volume of airflow in the overcooled cooling airflow 144, and thus the temperature and volume of the mixed air 154, can be reduced or increased by the controller 190 during operation of the gas turbine engine in response to engine conditions, atmospheric conditions, or any other conditions. In the controlled example, a controllable valve structure is installed at the cooling air exit 132, the overcooled airflow 144 exit from the heat exchanger 140, or both. The controllable valve structure is connected to the controller 190 allowing the controllable valve structure to adjust a volume of air passing through the controllable valve structure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section having a plurality of compressor stages;
   a combustor disposed within a combustor section, wherein the combustor section is fluidly connected to the compressor section;
   a turbine section fluidly connected to the combustor, said turbine section having at least one stage;
   a cooling air exit disposed on a wall of said combustor section;
   a first fluid pathway connecting said cooling air exit to an input of a heat exchanger;
   a second fluid pathway connecting a first output of said heat exchanger to a turbine injection system;
   an opening fluidly connecting said turbine injection system to said combustor section; and
   a mixing plenum downstream of said opening.

2. The gas turbine engine of claim 1, wherein the cooling air exit is disposed on a radially outward wall of the combustor section.

3. The gas turbine engine of claim 1, wherein the heat exchanger further comprises a second output, and wherein said second output is fluidly connected to at least one other engine component, thereby providing cooling air to the at least one other engine component.

4. The gas turbine engine of claim 3, wherein the at least one other engine component includes an engine bearing compartment.

5. The gas turbine engine of claim 1, wherein said mixing plenum is a segment of said turbine injection system downstream of said opening.

6. The gas turbine engine of claim 1, wherein said mixing plenum is disposed between an output of said turbine injection system and said turbine section.

7. The gas turbine engine of claim 1, wherein air entering said turbine injection system from said heat exchanger is below a first threshold temperature.

8. The gas turbine engine of claim 7, wherein air entering said turbine injection system through said opening is above a second threshold temperature, the second threshold temperature being higher than the first threshold temperature.

9. The gas turbine engine of claim 8, wherein air exiting said mixing plenum is at a temperature between the first threshold and the second threshold.

10. The gas turbine engine of claim 1, further comprising a controller controllably coupled to said buffer heat exchanger and operable to control active cooling operations of said heat exchanger.

11. The gas turbine engine of claim 10, further comprising at least one of a valve disposed in said cooling air exit and a valve disposed in said opening.

12. The gas turbine engine of claim 11, wherein at least one of said valve disposed in said cooling air exit and said valve disposed in said opening is controllably coupled to said controller.

13. A turbine injection system for a gas turbine engine comprising:
    a first end operable to receive air from a heat exchanger;
    a second end operable to distribute mixed cooling air to a turbine stage;
    an opening downstream of said first end, wherein said opening provides a direct fluid pathway into said turbine injection system; and
    a mixing plenum downstream of said first end and said opening.

14. The turbine injection system of claim 13, wherein air at said first end is at a temperature below a first threshold temperature.

15. The turbine injection system of claim 13, wherein a temperature of air at said opening exceeds a second threshold temperature, and wherein the second threshold temperature is in greater than the first threshold temperature.

16. The turbine injection system of claim 13, wherein a temperature of air at a downstream end of said mixing plenum is between said first threshold temperature and said second threshold temperature.

17. A method for providing cooling air to a turbine stage in a gas turbine engine comprising:
    extracting air from a combustor section;
    cooling said air using a heat exchanger;
    providing a first portion of said air to a cooling plenum;
    mixing said first portion of said air with combustor air in said cooling plenum; thereby achieving a desired cooling air temperature; and
    providing a second portion of said air to at least one other component of the gas turbine engine directly from said heat exchanger.

18. The method of claim 17, wherein mixing said first portion of said air with combustor air in said cooling plenum comprises receiving air directly from said combustor section through a turbine injection system opening upstream of said mixing plenum.

19. The method of claim 17, wherein cooling said air using a heat exchanger comprises overcooling said air below a first threshold temperature, wherein the first threshold temperature is a minimum temperature required to provide full cooling of at least one turbine stage without overcooling the at least one turbine stage.

20. The method of claim 17, wherein mixing said first portion of said air with combustor air in said cooling plenum, thereby achieving a desired cooling air temperature comprises mixing overcooled air from said heat exchanger with air directly from said combustor section.

21. The gas turbine engine of claim 1, wherein the turbine injection system is at least partially disposed radially inward of the combustor.

22. The gas turbine engine of claim 1, wherein the mixing plenum is radially inward of the combustor.

23. The gas turbine engine of claim 22, wherein the mixing plenum is at least partially axially downstream of the combustor.

24. The gas turbine engine of claim 13, wherein the direct fluid pathway into said turbine injection system is connected to a combustor section of a turbine engine.

25. The gas turbine engine of claim 1, wherein the mixing plenum is configured to mix air from the first output of the heat exchanger with air from the combustor section.

* * * * *